United States Patent [19]

Kaplan et al.

[11] Patent Number: 5,847,057

[45] Date of Patent: Dec. 8, 1998

[54] HEAT-CURABLE COATING COMPOUNDS

[75] Inventors: Andreas Kaplan, Chur; Manfred Wenzler, Domat/Ems, both of Switzerland

[73] Assignee: EMS—Inventa AG, Zurich, Switzerland

[21] Appl. No.: 960,781

[22] Filed: Oct. 30, 1997

[30] Foreign Application Priority Data

Oct. 30, 1996 [DE] Germany .......................... 196 43 914.0
Sep. 12, 1997 [DE] Germany .......................... 197 40 206.2

[51] Int. Cl.$^6$ .............................. C08F 20/00; C08G 63/02
[52] U.S. Cl. ........................ 525/437; 528/272; 528/275; 528/302; 528/307; 528/308; 525/444; 525/448; 525/534; 525/540; 524/81; 524/115; 524/127; 524/128

[58] Field of Search ...................... 528/272, 275, 528/302, 307, 308; 525/437, 444, 448, 534, 540; 524/81, 115, 127, 128

[56] References Cited

U.S. PATENT DOCUMENTS

| | | | |
|---|---|---|---|
| 4,801,680 | 1/1989 | Geary et al. | 528/272 |
| 4,837,271 | 6/1989 | Brindopke | 528/330.3 |
| 5,159,024 | 10/1992 | Brindopke et al. | 525/301 |
| 5,639,560 | 6/1997 | Moens et al. | 428/482 |

*Primary Examiner*—Samuel A. Acquah
*Attorney, Agent, or Firm*—Marshall & Melhorn

[57] ABSTRACT

The invention relates to heat-curable coating compounds containing a carboxyl-functional polyester produced by a condensation reaction from aliphatic and/or cycloaliphatic and/or aromatic polycarboxylic acids and anhydrides, a β-hydroxyalkylamide and special stabilizers.

25 Claims, No Drawings

HEAT-CURABLE COATING COMPOUNDS

The present invention relates to heat-curable coating compounds, particularly powder coatings with a specially selected stabiliser.

Powder coatings which contain as binders carboxyl-functional polyesters and β-hydroxyalkylamides have already been known for a considerable time.

U.S. Pat. No. 4,801,680 describes powder coatings on the basis of carboxyl-functional polyesters and β-hydroxyalkylamides, the polyester having a Tg in the range of 30° C. to 85° C., and the ratio of β-hydroxyalkylamide equivalents to carboxylic acid equivalents lies in the range of 0.6 to 1.6:1.

Toxicologically harmless powder coatings on the basis of carboxyl-functional polyesters and β-hydroxyalkylamides, in addition to outstanding mechanical properties, also reveal extremely good outdoor stability against weathering and are therefore suitable for outdoor use.

The lower yellowing stability of powder coatings on the basis of carboxyl-functional polyesters and β-hydroxyalkylamides in direct gas- or oil-fired ovens in comparison to powder coatings on the basis of carboxyl-functional polyesters and trisglycidil-isocyanurate (TGIC), is regarded as a disadvantage.

In the case of direct gas- and/or oil-fired ovens, the coated parts are in direct contact during the curing process with the combustion gases of the gas- and/or oil-heated burners. In the case of powder coatings on the basis of carboxyl-functional polyesters and β-hydroxyalkylamides, this leads to heavier yellowing of the cured powder coating film, in comparison to powder coatings on the basis of carboxyl-functional polyesters and trisglycidyl-isocyanurate (TGIC).

The object of the present invention is to remove this disadvantage of lower stability of powder coatings on the basis of carboxyl-functional polyesters and β-hydroxyalkylamides in directly gas- and/or oil-fired ovens.

This object is achieved by the characterizing features of claim 1. Advantageous further developments of the invention are given in the sub-claims.

It has become surprisingly apparent that, by means of the addition of specially selected stabilisers, the disadvantage of lower yellowing stability of powder coatings on the basis of carboxyl-functional polyesters and β-hydroxyalkylamides in directly gas- and/or oil-fired ovens can be removed. According to the invention, compounds of the general formulas I–X are used for this purposes. Accordingly, the coating compound comprises:

(A) carboxyl-functional polyesters produced by a condensation reaction from aliphatic and/or cyclo-aliphatic polyols with aliphatic and/or cycloaliphatic and/or aromatic polycarboxylic acids and anhydrides, the polyesters having a Tg in the range of 30° C. and an acid value of about 20 to 100 (mg KOH/g), and (B) a β-hydroxyalkylamide, the equivalent ratio of β-hydroxyalkylamide equivalents to carboxylic acid equivalents lying in the rang 0.6 to 1.6:1 and (C) at least one compound of the formula I–X or their mixtures the compounds of the formulas I–X are given in the following:

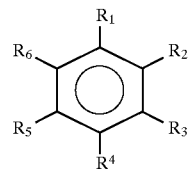
Formula I + II

I: with $R_1$=OH, $R_2$=$OR_7$, $R_3$, $R_4$, $R_5$, $R_6$, $R_7$=H or $C_1$–$C_{10}$-linear or branched alkyl and/or halogen atom II: with $R_1$=OH, $R_4$=$OR_7$, $R_2$, $R_3$, $R_5$, $R_6$, $R_7$=H or $C_1$–$C_{10}$-linear or branched alkyl and/or halogen atoms

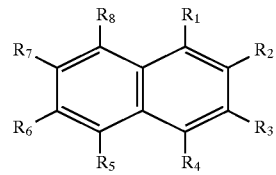
Formula III–VI

III: with $R_1$=OH, $R_2$=$OR_9$, $R_3$, $R_4$, $R_5$, $R_6$, $R_7$, $R_8$, $R_9$=H or $C_1$–$C_{10}$-linear or branched alkyl and or halogen atoms IV: with $R_1$=OH, $R_4$=$OR_9$, $R_2$, $R_3$, $R_5$, $R_6$, $R_7$, $R_8$, $R_9$=H or $C_1$–$C_{10}$-linear or branched alkyl and/or halogen atoms V: with $R_1$=OH, $R_8$=$OR_9$, $R_2$, $R_3$, $R_4$, $R_5$, $R_6$, $R_7$, $R_9$=H or $C_1$–$C_{10}$-linear or branched alkyl and/or halogen atoms VI: with $R_2$=OH, $R_6$=$OR_9$, $R_2$, $R_3$, $R_4$, $R_5$, $R_7$, $R_8$, $R_9$=H or $C_1$–$C_{10}$-linear or branched alkyl and/or halogen atoms

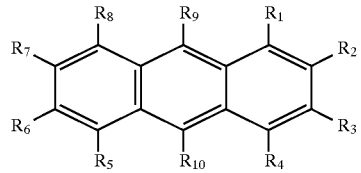
Formula VII–IX

VII: with $R_1$=OH, $R_4$=$OR_{11}$, $R_2$, $R_3$, $R_5$, $R_6$, $R_7$, $R_8$, $R_{11}$=H or $C_1$–$C_{10}$-linear or branched alkyl and/or halogen atoms VIII: with $R_2$=OH, $R_6$=$OR_{11}$, $R_1$, $R_3$, $R_4$, $R_5$, $R_7$, $R_8$, $R_9$, $R_{10}$, $R_{11}$=H or $C_1$–$C_{10}$-linear or branched alkyl and/or halogen atoms IX: with $R_9$=OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-linear or branched alkyl and/or halogen atoms

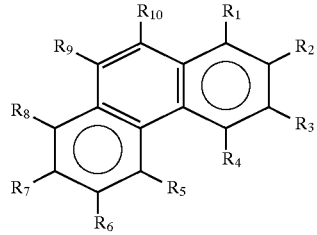
Formula X

X: with $R_9$=OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-linear or branched alkyl and/or halogen atoms and if necessary pigments and/or fillers and/or heat stabilisers, preferably phosphites and triboadditives and/or further additives such e.g. as flow control and/or degasing agents.

In the compounds I–X hydroquinone, toluolhydroquinone, trimethylhydroquinone and mono-tert.-buthylhydroqinone are particularly preferred.

It is of advantage, if the proportion of compounds I–X in the overall mass lies between 0,001 and 10% by weight, particularly preferably 0.01 and 5% by weight.

Appropriate carboxyl-functional polyesters can be produced according to the condensation processes, (esterification and/or ester interchange) known for polyesters according to prior art. Appropriate catalysts, such e.g. as dibutyl tin oxide or titanium tetrabutylate can, if necessary, be used.

Carboxyl-functional copolyesters contain as acid components mainly aromatic multifunctional carboxylic acids, such for example as terephthalic acid, isophthalic acid, phthalic acid, pyromellithic acid, trimellithic acid 3,6-dichlorophthathalic acid, tetrachlorophthalic acid, and, where available, their anhydride, chloride or ester.

They usually contain at least 50 mol-% terephthalic acid and/or isophthalic acid, preferably 80 Mol-%. The residue of the acids (difference from 100 Mol-%) consists of aliphatic and/or cycloaliphatic multibasic acids, such e.g. as 1,4-cyclohexane dicarboxylic acid, tetrahydrophthalic acid, hexachlorophthalic acid, azelaic acid, sebacic acid, decandicarboxylic acid, adipic acid, dodecandicarboxylic acid, succinic acid, maleic acid or dimeric fatty acids, hydroxycarboxylic acids and/or lactones, such e.g. as 12-hydroxystearic acid, epsilon-Caprolacton or hydroxypivalic acid esters of neopentyl glycol, may likewise be used.

Monocarboxylic acids, such e.g. as benzoic acid tertiary butylbenzoic acid, hexahydrobenzoic acid and saturated aliphatic carboxylic acids, can also be used in small quantities.

There may be cited as appropriate alcohol components aliphatic diols, such e.g. as ethylene glycol, 1,3-propanediol, 1,2-butanediol, 1,3-butanediol, 1,4-butanediol, 2,2-dimethylpropanediol-1,3 (neopentyl-glycol), 2,5-hexanediol, 1,6-hexanediol, 2,2-[bis-(4-hydroxycyclohexal)]propane, 1,4-dimethylol cyclohexane, diethylene glycol, dipropylene glycol and 2,2-bis-[4-(2-hydroxy)] phenylpropane. Polyols may also be used in smaller quantities, such e.g. as glycerol, haexanetriol, pentaeryltritol, sorbitol, trimethylolethane, trimethylolpropane and tris (2-hydroxy) isocyanurate.

Epoxide compounds can also be used instead of diols or polyols. The proportion of neopentyl glycol and/or propylene glycol in the alcohol) components preferably comes to at least 50 Mol-%, with respect to the overall acids.

The β-hydroxyalkylamides of the coating compound according to the invention used must contain at least two β-hydroxyalkylamide groups per molecule and are substantially characterised by the following formula (XI):

Formula XI

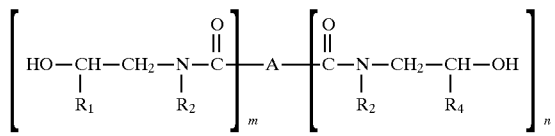

in which $R_1$ is hydrogen or ($C_1$–$C_5$-alkyl, $R_2$ is hydrogen, $C_1$–$C_5$-alkyl or

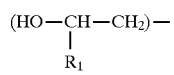

in which $R_1$ has the meaning ascribed herein before, and A is a chemical bond or a monovalent or multivalent organic group derived from saturated, unsaturated or aromatic hydrocarbon groups including substituted hydrocarbon groups with 2 to 20 carbon atoms, m is 1 to 2, n is 0 to 2 and m+n is at least 2.

Particularly preferred β-hydroxyalkylamides for the coating compound according to the invention are as follows:

Bis[N,N'-di(β-hydroxyethyl)]-adipamide
Bis[N,N'-di(β-hydroxypropyl)]-adipamide

Production of the β-hydroxyalkylamides is effected in a known way by conversion of the esters of the corresponding dicarboxylic acid with alkanolamines in heat.

The ratio of β-hydroxyalkylamide equivalents to carboxylic acid equivalents lies in the range from 0.6 to 1.6:1.

The conventional pigments and/or fillers and/or additives may be used for the production of powder coatings. These are additives from the group comprising accelerators, f low control and degasification agents, heat, WV and/or HALS stabilisers and/or triboadditives and, as is necessary, matting agents such e.g. as waxes. Powder coatings are preferably produced in the melt by common extrusion of all formula components at temperatures between 60° to 140° C. The extrudate is then cooled, ground and, screened to a granular size of <90 μm. Basically, other methods are also suitable for producing the powder coatings, such e.g. as mixing the formula components in solution and subsequent precipitation or distillative removal of the solvents. The powder coatings according to the invention are applied according to methods conventional for powder coatings, e.g. by means of electrostatic spraying devices (Corona or Tribo) or according to the fluidised bed process. Testing for yellowing resistance in the laboratory is effected in that the panels coated with powder coating are cured in an electric oven, a mixture comprising sodium nitrite and 30% acetic acid serving as a delivery vehicle for nitrous gases. Thereupon colour changes in the powder coating, film is determined by means of a LAB system in comparison to a powder coating film Which has been cured only in an electric oven without nitrous gases.

Comparative Example 533,85 g Grilesta V76-42 (carboxyl-functional co-polyester of the company UCB (B) with an acid value of 33 [mgKOH/g] and a Tg of ca. 60° C.), 29,15 g Primid XL 552 (Bis[N,N'-di(β-hydroxylethyl)]-adipamide of the company EMS-Chemie AG (CH), 400 g Kronos C1 2160 (Ti02 of company Kronos (D), 8 g Resiflow PV 88 (flow-control agent on polyacrylate base, commercial product of the company Worlée-Chemie GmbH), 7.0 g Irgafos PEPQ (phosphite-containing heat stabiliser of the company Ciba (CH), and 2 g benzoin are mixed dry in a Henschel mixer at 700 rpm, for 30 sec and then extruded on a cooled screw on a Buss-Co Kneader (PLK 46) at a barrel temperature of 100° C. and at a screw speed of 150 rpm. The extrudate is cooled, ground and screened to <90 μm.

The powder coatings are applied electrostatically (Corona or Tribo) on aluminium panels (Q-panel AL-36 5005H 14/08 (0.8 mm) and cured at a curing temperature of 180° C. and a curing time of 30 minutes in the electric oven UT6060 of the Company Haereus (D), which has been provided, shortly before the coated aluminium panels were introduced, with a mixture of 0.5 g sodium nitrite and 1.25 g of a 30% acetic acid. As a reference, curling is carried out in the electric oven under the same curing conditions without nitrous gases, and the colour change is determined by the colour measuring apparatus Colorpren of the Company Dr. Lange (D). The coasting thickness comes to about 60 μm.

Table 1 shows the yellowing properties.

EXAMPLE 1

552.9 g Grilesta V 76-42 (carboxyl-functional co-polyester of the company UCB (B) with an acid value of 33 (mgKOH/gl and a Tg of ca. 60° C.), 29.1 g Primid XL 552 (Bis[N,N'di(β-hydroxyethyl)]-adipamide of the company EMS-Chemie AG (CH), 1.0 g hydroquinone, 400 g Kronos Cl 2160 TIO2 of the company Kronos (D), 8 g Resiflow PV 88 (flow-control agent on polyacrylate base, commercial product of company Worlée-Chemie GmbH), 7.0 g Irgafos PEPQ (phosphite-containing heat stabiliser) of company Ciba (CH) and 2 g benzoin are processed to produce powder coating, and tested, analogously to the comparative Example.

Table 1 shows the yellowing properties,.

EXAMPLE 2

552.9 g Grilesta V 76-42 (carboxyl-functional co-polyester of company UCB (B) with an acid value of 33 mgKOH/g) and a Tg of ca. 60° C.), 29.1 g Primid XL 552 (Bis[N,N'-di(β-hydroxyethyl)]-adipamide of company EMS-Chemie AG (CH), 1.0 g toluhydroquinone, 400 g Kronos Cl 2160 (Ti02 of company Kronos (D), 8 g Resiflow PV 88 (flow-control agent on polyacrylate base, commercial product of company Worlée-Chemie GmbH), 7.0 g Irgafos PEPQ (phosphite-containing heat stabiliser) of company Ciba (CH) and 2 g benzoin are processed to produce powder coating, and tested, analogously to the Comparative Example.

Table 1 shows the yellowing properties.

EXAMPLE 3

552.95 g Grilesta V 76-42 (carboxyl-functional co-polyester of company UCB (B) with an acid value of 33 [mgKOH/g] and a Tg of ca. 60° C.), 29.1 g Primid XL 552 (Bis[N,N'-di(β-hydroxyethyl)]-adipamide of company EMS-Chemie AG (CH), 1.0 g trimethylhydroquinone, 400 g Kronos Cl 2160 (Ti02 of company Kronos (D), 400 g Resiflow PV 88 (flow-control agent on polyacrylate base, commercial product of company Worlée-Chemie GmbH), 7.0 g Irgafos PEPQ (phosphite-containing heat stabiliser) of company Ciba (CH) and 2 g benzoin processed to produce powder coating, and tested, analogously to the comparative Example.

Table 1 shows the yellowing properties.

TABLE 1

| | White grade n. Berger electric furnace | white grade n. Berger/ electric furnace and nitrous gases | Colour difference delta E electric furnace and nitrous gases/ electric furnace |
|---|---|---|---|
| Comparative Example | 86 | 82 | 4.5 |
| Example 1 | 86 | 82 | 1.3 |
| Example 2 | 86 | 82 | 1.2 |
| Example 3 | 86 | 82 | 1.4 |

We claim:
1. A heat-curable coating compound, comprising:
(A) A carboxyl-functional polyester, produced by a condensation reaction from one or more compounds selected from the group consisting of aliphatic and cycloaliphatic polyols with one or more compounds selected from the group consisting of aliphatic, cycloaliphatic and aromatic polycarboxylic acids, the polyester having a Tg between 30° C. and 80° C. and an acid value between 20 and 100 (mg KOH/g);
(B) a β-hydroxyalkylamide, a ratio of β-hydroxyalkylamide equivalents to carboxylic acid equivalents lying between 0.6 and 1.6:1; and

(C) at least one compound of the following general formulas (I)–(X) or their mixtures:

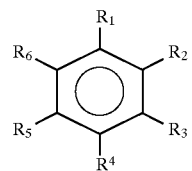

Formula I + II

I: with $R_1$=OH, $R_2$=$OR_7$, $R_3$, $R_4$, $R_5$, $R_6$, $R_7$=identical or different and selected from the group consisting of H, $C_1$–$C_{10}$-linear or branched alkyls and halogen atoms II: with $R_1$=OH, $R_4$=$OR_7$, $R_2$, $R_3$, $R_5$, $R_6$, $R_7$=identical or different and selected from the group consisting of H, $C_1$–$C_{10}$-linear or branched alkyls and halogen atoms

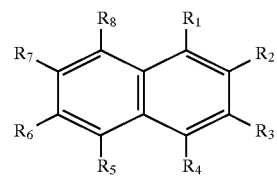

Formula III-VI

III: with $R_1$=OH, $R_2$=$OR_9$, $R_3$, $R_4$, $R_5$, $R_6$, $R_7$, $R_8$, $R_9$=identical or different and selected from the group consisting of H, $C_1$–$C_{10}$-linear or branched alkyls and halogen atoms IV: with $R_1$=OH, $R_4$=$OR_9$, $R_2$, $R_3$, $R_5$, $R_6$, $R_7$, $R_8$, $R_9$=identical or different and selected from the group consisting of H, $C_1$–$C_{10}$-linear or branched alkyls and halogen atoms V: with $R_1$=OH, $R_8$=$OR_9$, $R_2$, $R_3$, $R_4$, $R_5$, $R_6$, $R_7$, $R_9$=identical or different and selected from the group consisting of H, $C_1$–$C_{10}$-linear or branched alkyls and halogen atoms VI: with $R_2$=OH, $R_6$=$OR_9$, $R_2$, $R_3$, $R_4$, $R_5$, $R_7$, $R_8$, $R_9$=identical or different and selected from the group consisting of H, $C_1$–$C_{10}$-linear or branched alkyls and halogen atoms

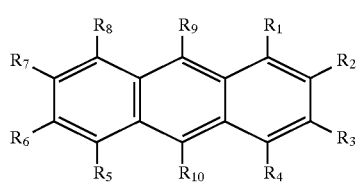

Formula VII-IX

VII: with $R_1$=OH, $R_4$=$OR_{11}$, $R_2$, $R_3$, $R_5$, $R_6$, $R_7$, $R_8$, $R_9$, $R_{10}$, $R_{11}$=identical or different and selected from the group consisting of H, $C_1$–$C_{10}$-linear or branched alkyls and halogen atoms VIII: with $R_2$=OH, $R_6$=$OR_{11}$, $R_1$, $R_3$, $R_4$, $R_5$, $R_7$, $R_8$, $R_9$, $R_{10}$, $R_{11}$=identical or different and selected from the group consisting of H, $C_1$–$C_{10}$-linear or branched alkyls and halogen atoms IX: with $R_9$=OH, $R_{10}$=$OR_{11}$, $R_1$, $R_2$, $R_3$, $R_4$, $R_5$, $R_6$, $R_7$, $R_8$, $R_{11}$=identical or different and selected from the group consisting of H, $C_1$–$C_{10}$-linear or branched alkyls and halogen atoms

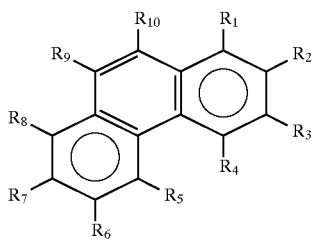

Formula X

X: with $R_9$=OH, $R_{10}$=OR$_{11}$, $R_1$, $R_2$, $R_3$, $R_4$, $R_5$, $R_6$, $R_7$, $R_8$, $R_{11}$=identical or different and selected from the group consisting of H, $C_1$–$C_{10}$-linear or branched alkyls and halogen atoms 2. The heat curable coating compound according to claim 1, wherein a proportion of compounds (I) to (X) with respect to an overall mass of the coating compound lies between 0.001% weight and 10% weight.

3. The heat-curable coating compound according to claim 1, wherein the compounds (I) to (X) are selected from the group consisting of hydroquinone, toluhydroquinone, trimethylhydroquinone, and mono-tert.-buthylhydroquinone.

4. The heat-curable coating compounds according to claim 1, wherein the β-hydroxyalkylamide has the formula XI:

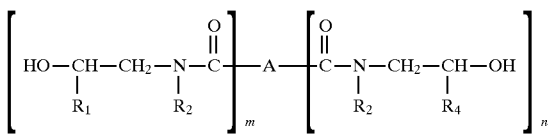

Formula XI in which $R_1$ is hydrogen or a $C_1$–$C_5$-alkyl, $R_2$ is selected from the group consisting of hydrogen, $C_1$–$C_5$-alkyl and

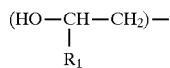

in which $R_1$ has the meaning described hereinbefore and A is a chemical bond or a monovalent or a multivalent organic group, derived from saturated, unsaturated or aromatic hydrocarbon groups, including substituted hydrocarbon groups with 2 to 20 carbon atoms; m is 1 to 2, n is 0 to 2 and m+n is at least 2.

5. The heat-curable coating compounds according to claim 1, wherein the β-hydroxyalkylamide is selected from the group consisting of
Bis[N,N'-di(β-hydroxyethyl)]-adipamide and
Bis[N,N'-di(β-hydroxypropyl)]-adipamide.

6. The heat curable coating compound according to claim 1, further comprising one or more additives.

7. The heat curable coating compound according to claim 6, wherein the one or more additives, are selected from the group consisting of pigments, fillers, heat-stabilisers, flow control agents and degasing agents.

8. The heat-curable coating compound according to claim 6, wherein the one or more additives are selected from the group consisting of phosphites and triboadditives.

9. The heat-curable coating compound according to claim 2, wherein the proportion liens between 0.01 and 5% by weight.

10. The heat curable coating compound according to claim 1, wherein the carboxyl-functional polyester is produced by a condensation reaction from one or more compounds selected from the group consisting of aliphatic and cycloaliphatic polyols with anhydrides and one or more compounds selected from the group consisting of aliphatic, cycloaliphatic and aromatic polycarboxylic acids.

11. The heat curable coating compound according to claim 3, wherein the β-hydroxyalkylamide has the formula XI:

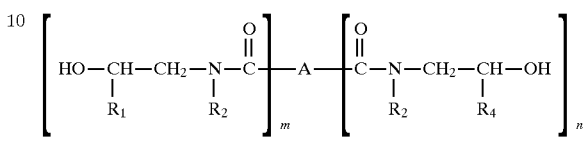

Formula XI in which $R_1$ is hydrogen or a $C_1$–$C_5$-alkyl, $R_2$ is selected from the group consisting of hydrogen, $C_1$–$C_5$-alkyl and

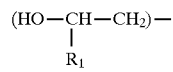

in which $R_1$ has the meaning described hereinbefore and A is a chemical bond or a monovalent or a multivalent organic group, derived from saturated, unsaturated or aromatic hydrocarbon groups, including substituted hydrocarbon groups with 2 to 20 carbon atoms, m is 1 to 2, n is 0 to 2 and m+n is at least 2.

12. The heat-curable coating compound according to claim 3, wherein the β-hydroxyalkylamide is selected from the group consisting of
Bis[N,N'-di(β-hydroxyethyl)]-adipamide and
Bis[N,N'-di(β-hydroxypropyl)]-adipamide.

13. The heat-curable coating compound according to claim 2, wherein the compounds (I) to (X) are selected from the group consisting of hydroquinone, toluhydroquinone, trimethylhydroquinone, and mono-tert.-butylhydroquinone.

14. The heat-curable coating compound according to claim 2, wherein the β-hydroxyalkylamide has the formula XI:

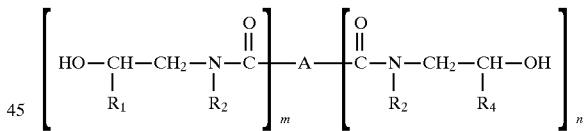

Formula XI in which $R_1$ is hydrogen or a $C_1$–$C_5$-alkyl, $R_2$ is selected from the group consisting of hydrogen, $C_1$–$C_5$-alkyl and

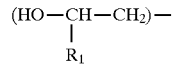

in which $R_1$ has the meaning described hereinbefore and A is a chemical bond or a monovalent or a multivalent organic group, derived from saturated, unsaturated or aromatic hydrocarbon groups, including substituted hydrocarbon groups with 2 to 20 carbon atoms, m is 1 to 2, n is 0 to 2 and m+n is at least 2.

15. The heat-curable coating compound according to claim 2, further comprising one or more additives.

16. The heat-curable coating compound according to claim 3, further comprising one or more additives.

17. The heat-curable coating compound according to claim 4, further comprising one or more additives.

18. A powder coating, comprising:
(A) a carboxyl-functional polyester, produced by a condensation reaction from one or more compounds selected from the group consisting of aliphatic and cycloaliphatic polyols with one or more compounds selected from the group consisting of aliphatic, cycloaliphatic and aromatic polycarboxylic acids, the polyester having a Tg between 30° C. and 80° C. and an acid value between 20 and 100 (mg KOH/g);

(B) a β-hydroxyalkylamide, a ratio of β-hydroxyalkylamide equivalents to carboxylic acid equivalents lying between 0.6 and 1.6:1;

(C) at least one additive; and (D) at least one compound of the following general formulas (I)–(X) or their mixtures:

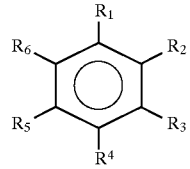

Formula I + II

I: with $R_1$=OH, $R_2$=$OR_7$, $R_3$, $R_4$, $R_5$, $R_6$, $R_7$=identical or different and selected from the group consisting of H, $C_1$–$C_{10}$-linear or branched alkyls and halogen atoms II: with $R_1$=OH, $R_4$=$OR_7$, $R_2$, $R_3$, $R_5$, $R_6$, $R_7$=identical or different and selected from the group consisting of H, $C_1$–$C_{10}$-linear or branched alkyls and halogen atoms

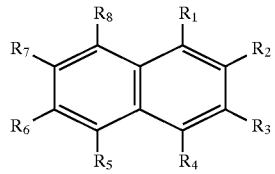

Formula III-VI

III: with $R_1$=OH, $R_2$=$OR_9$, $R_3$, $R_4$, $R_5$, $R_6$, $R_7$, $R_8$, $R_9$=identical or different and selected from the group consisting of H, $C_1$–$C_{10}$-linear or branched alkyls and halogen atoms IV: with $R_1$=OH, $R_4$=$OR_9$, $R_2$, $R_3$, $R_5$, $R_6$, $R_7$, $R_8$, $R_9$=identical or different and selected from the group consisting of H, $C_1$–$C_{10}$-linear or branched alkyls and halogen atoms V: with $R_1$=OH, $R_8$=$OR_9$, $R_2$, $R_3$, $R_4$, $R_5$, $R_6$, $R_7$, $R_9$=identical or different and selected from the group consisting of H, $C_1$–$C_{10}$-linear or branched alkyls and halogen atoms VI: with $R_2$=OH, $R_6$=$OR_9$, $R_2$, $R_3$, $R_4$, $R_5$, $R_7$, $R_8$, $R_9$=identical or different and selected from the group consisting of H, $C_1$–$C_{10}$-linear or branched alkyls and halogen atoms

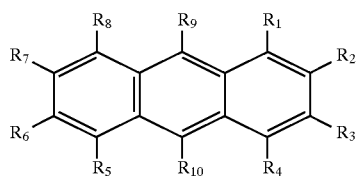

Formula VII-IX

VII: with $R_1$=OH, $R_4$=$OR_{11}$, $R_2$, $R_3$, $R_5$, $R_6$, $R_7$, $R_8$, $R_9$, $R_{10}$, $R_{11}$=identical or different and selected from the group consisting of H, $C_1$–$C_{10}$-linear or branched alkyls and halogen atoms VIII: with $R_2$=OH, $R_6$=$OR_{11}$, $R_1$, $R_3$, $R_4$, $R_5$, $R_7$, $R_8$, $R_9$, $R_{10}$, $R_{11}$=identical or different and selected from the group consisting of H, $C_1$–$C_{10}$-linear or branched alkyls and halogen atoms IX: with $R_9$=OH, $R_{10}$=$OR_{11}$, $R_1$, $R_2$, $R_3$, $R_4$, $R_5$, $R_6$, $R_7$, $R_8$, $R_{11}$=identical or different and selected from the group consisting of H, $C_1$–$C_{10}$-linear or branched alkyls and halogen atoms

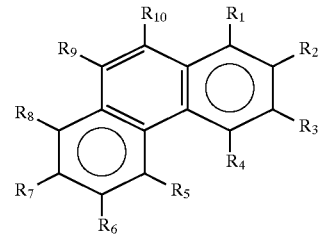

Formula X

X: with $R_9$=OH, $R_{10}$=$OR_{11}$, $R_1$, $R_2$, $R_3$, $R_4$, $R_5$, $R_6$, $R_7$, $R_8$, $R_{11}$=identical or different and selected from the group consisting of H, $C_1$–$C_{10}$-linear or branched alkyls and halogen atoms.

19. The powder coating according to claim 18, wherein the at least one additive is selected from the group consisting of pigments and fillers.

20. The powder coating according to claim 18, wherein the powder coating is produced from an extrudate of components (A) to (D).

21. The powder coating according to claim 20, wherein the powder paint has a granular size of less than 90 μm.

22. The powder coating according to claim 18, wherein a proportion of compounds (I) to (X), with respect to an overall mass lies between 0.001% weight and 10% weight.

23. The powder coating according to claim 18, wherein the compounds (I) to (X) are selected from the group consisting of hydroquinone, toluhydroquinone, trimethylhydroquinone, and mono-tert.-butylhydroquinone.

24. The powder coating according to claim 18, wherein the β-hydroxyalkylamide has the formula XI:

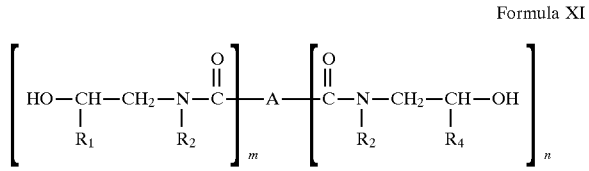

Formula XI in which $R_1$ is hydrogen or a $C_1$–$C_5$-alkyl, $R_2$ is selected from the group consisting of hydrogen, $C_1$–$C_5$-alkyl and

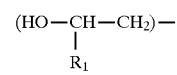

in which $R_1$ has the meaning described hereinbefore and A is a chemical bond or a monovalent or a multivalent organic group, derived from saturated, unsaturated or aromatic hydrocarbon groups, including substituted hydrocarbon groups with 2 to 20 carbon atoms, m is 1 to 2, n is 0 to 2 and m+n is it least 2.

25. The powder coating according to claim 18, wherein the β-hydroxyalkylamide is selected from the group consisting of
Bis[N,N'-di(β-hydroxyethyl)]-adipamide and
Bis[N,N'-di(β-hydroxypropyl)]-adipamide.

* * * * *